United States Patent
Heyden et al.

(10) Patent No.: US 6,603,234 B2
(45) Date of Patent: Aug. 5, 2003

(54) METHOD FOR PRODUCING A WINDING, AND WINDING FOR ELECTRICAL MACHINES, AS WELL AS AN ELECTRICAL MACHINE

(75) Inventors: Marcus van Heyden, Schweinfurt (DE); Alfred Tareilus, Schweinfurt (DE); Edmund Grau, Poppenhausen (DE); Matthias Richter, Schwebhein (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/777,049

(22) Filed: Feb. 5, 2001

(65) Prior Publication Data

US 2002/0047443 A1 Apr. 25, 2002

(30) Foreign Application Priority Data

Feb. 5, 2000 (DE) .......................... 100 05 179

(51) Int. Cl.$^7$ ............................................. H02K 15/08
(52) U.S. Cl. ...................... 310/194; 310/179; 310/180; 310/208
(58) Field of Search ................................ 310/194, 179, 310/180, 195, 198, 201, 208; 336/187

(56) References Cited

U.S. PATENT DOCUMENTS

| | | | | |
|---|---|---|---|---|
| 1,834,114 A | * | 12/1931 | Wiggins ..................... | 336/187 |
| 2,436,188 A | * | 2/1948 | Bilodeau ..................... | 29/605 |
| 2,829,355 A | * | 4/1958 | Eberle ........................ | 336/180 |
| 3,118,015 A | * | 1/1964 | Willyoung ................... | 174/33 |
| 3,188,377 A | * | 6/1965 | Hughes ........................ | 174/33 |
| 3,252,117 A | * | 5/1966 | Fischer ......................... | 174/33 |
| 3,283,280 A | * | 11/1966 | Fischer ......................... | 171/34 |
| 3,348,182 A | * | 10/1967 | Baker et al. ................. | 336/187 |
| 3,359,518 A | * | 12/1967 | Stein ........................... | 336/150 |
| 3,585,428 A | * | 6/1971 | Bennington ................. | 310/213 |
| 3,747,205 A | * | 7/1973 | Moore ......................... | 140/149 |

FOREIGN PATENT DOCUMENTS

| | | | |
|---|---|---|---|
| DE | 315354 | 8/1915 | |
| DE | 506 860 | 9/1930 | |
| DE | 613 780 | 5/1935 | |
| DE | 197 54 943 | 6/1999 | |
| GB | 263 833 | 9/1927 | |
| JP | 10285880 | 10/1998 | .......... H02K/15/02 |
| JP | 11164526 | 6/1999 | .......... H02K/15/02 |

OTHER PUBLICATIONS

Patent Abstracts of Japan, vol. 9, No. 65 (Mar. 1985), Hitachi Ltd.

* cited by examiner

Primary Examiner—Burton S. Mullins
(74) Attorney, Agent, or Firm—Cohen, Pontani, Lieberman & Pavane

(57) ABSTRACT

In a method for producing a winding for electrical machines, a plurality of conductor elements are fitted on a winding former or stator tooth. The conductor elements are aligned parallel to one another in a predetermined order and are placed alongside one another in a slot while being fitted onto the winding former, with the predetermined order being reversed at least once while being fitted, so that the elements change their position on the winding former, at least in places. The winding process is carried out by machine, with the winding former being rotated under a number of wire guide nozzles, the wire guide nozzles being rotated through 180° as a group after a defined number of turns.

5 Claims, 4 Drawing Sheets

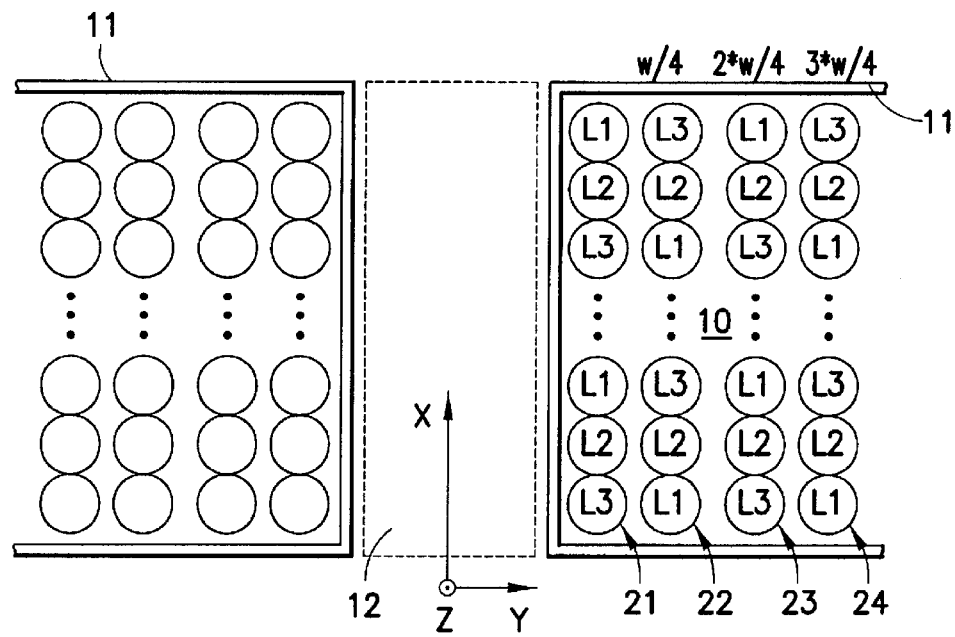
FIG.1
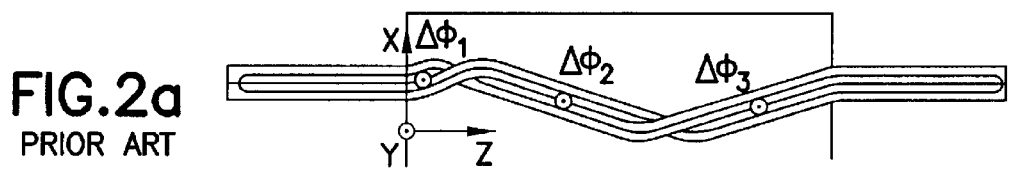
FIG.2a
PRIOR ART
FIG.2b
FIG.2c
PRIOR ART
FIG.2d

METHOD FOR PRODUCING A WINDING, AND WINDING FOR ELECTRICAL MACHINES, AS WELL AS AN ELECTRICAL MACHINE

BACKGROUND OF THE INVENTION

1. Field of the Invention

The present invention relates to a method for producing a winding for electrical machines wherein a number of conductor elements are fitted on a winding former, a winding for an electrical machine having a large number of conductor elements which are carried by a winding former and form a number of turns, and an electrical machine.

2. Description of the Related Art

Electrical machines, such as synchronous machines, have slots in which one or more current-carrying windings are placed. The slots with the windings can be located, for example, in the stator or else in the rotor of the electrical machine. During operation of such electrical machines, however, a non-uniform current distribution can in certain circumstances occur across the copper or conductor cross section in the slots. The slot height as well as the frequency of the current are significant factors in this case.

The non-uniform current distribution or one-sided or two-sided current displacement occurs in particular in large machines with bar windings and in the rotor bars of asynchronous squirrel-cage rotors. However, current displacement can also occur in the stators of small machines, for example if they are operated at high frequencies in order to achieve better utilization. These frequencies may be more than two kilohertz, with the operation of such electrical machines being made possible by modern converter technology.

In asynchronous motors, the effect of the non-uniform current distribution is advantageously used to increase the rotor resistance during starting, when a high slip frequency occurs.

Owing to the increase in the resistive heat losses, the current displacement is undesirable. Attempts have therefore been made to suppress the current displacement in windings through which alternating current or a current which changes with time flows during operation.

Various measures for suppressing current displacement are known, such as subdividing the conductor into parallel conductor elements, thus resulting in smaller conducting heights for the same conductor width. In this case, conductors located one above the other may have different conductor heights. Owing to the stray flux linking between the conductor elements, subdivision into parallel conductor elements generally does not lead to adequate suppression of current displacement.

In order to suppress the current displacement more effectively, attempts have therefore been made to form the conductor elements into layers. In the process, the sequence of the conductor elements in the slots is changed. In the case of two-layer windings, this results naturally as a consequence of the end winding design. Owing to the change in the sequence of the conducting elements in the slots, the integration path which governs an eddy current path has comprises field elements in opposite directions. This means that the individual flux elements partially compensate for one another, and the resultant flux linking becomes less.

Synthetic bars result in the stray flux linking within the slot area of an electrical machine formed from any two conductor elements disappearing completely. Such synthetic bars are subdivided conductors whose layers within the slot region are configured such that the flux linking of every possible eddy current path passing through the conductor elements disappears.

One known synthetic bar is the transposed conductor which is illustrated in FIGS. 2a and 2b. In this bar, the conductor elements uniformly pass through all the height layers in a slot and leave the slot in the same height layer in which they enter the slot.

DE 197 54 943 A1 describes a double transposed conductor for the winding of an electrical machine, in which conductor elements are arranged in a number of adjacent stacks. Two adjacent conductor elements are in each case routed as a conductor element pair alongside one another over the entire length of a conductor, and are twisted as they do so. To achieve the desired twisting, the conductor elements are not only bent parallel but are also bent to be crossed over, in order to achieve optimum compensation for the transverse and radial fields during operation of the electrical machine.

The known synthetic bars including transposed conductors have the disadvantage, however, that they cannot be produced using modern automatic winding machines. Furthermore, the frequent crossing over of the conductor elements in the slot area, with the conductors being routed obliquely, leads to greater conductor element lengths and to poorer copper filling factors in the slot.

SUMMARY OF THE INVENTION

The object of the present invention is thus to specify a method for producing a winding for electrical machines which can be carried out more easily and by means of which a winding with an improved filling factor and adequate suppression of current displacement can be achieved. Furthermore, it is intended to provide a winding for an electrical machine, and an electrical machine, in which, during operation, current displacement is adequately suppressed, and which winding can also be produced by machine with a high filling factor.

This object is achieved by the method for producing a winding for electrical machines wherein the conductor elements (L1, L2, L3) are aligned parallel to one another in a predetermined order while being wound onto the winding former and, while being wound, the predetermined order is reversed in at least one place on the winding former. Advantageous features, aspects and details of the invention are evident from the description and the drawings. Advantages and features which are described with reference to the method likewise apply to the apparatus, and advantages and features which are described with respect to the apparatus likewise apply to the method according to the invention. Analogous statements apply to the electrical machine.

In the method according to the present invention for producing a winding for electrical machines, a number of conductor elements are fitted on a winding former, with the conductor elements being aligned parallel to one another while being fitted onto the winding former, and with the parallel-aligned conductor elements being reversed at least once, for example jointly, while being fitted, so that, at least in places, they change their position on the winding former. It is thus possible to produce a winding with a high filling factor, in which case, furthermore, the winding can also be produced by machine, and by means of which current displacement is effectively suppressed during operation of the electrical machine.

The conductor elements are advantageously placed in a slot, with the conductor element which is located deepest in the slot being located furthest upward after reversal. It is thus possible to produce windings in the slots of electrical machines, in which windings the current displacement during operation is particularly low.

The conductor elements are preferably fed by means of guide elements, in particular by means of wire guide nozzles. The guide elements or wire guide nozzles are rotated through 180°, for example in order to reverse the conductor elements during the winding process. A number of parallel wires are thus fitted, for example, onto a rotating winding former, thus producing a winding with a specific number of turns, and at a defined feed rate.

The parallel alignment and the wires or conductor elements placed parallel alongside one another result in a particularly high copper filling factor which may be, for example, up to 20% greater than in the case of conventional winding production. The reversal of the conductor elements, or the rotation of the wire guide nozzles through 180°, results in the conductor elements being reversed in layers. This results in uniform stray flux linking of the conductor elements, and thus also uniform current distribution between the conductor elements, the number of which is governed, for example, by the number of wire guide nozzles.

The reversal of the conductor elements is preferably in each case defined by a number of turns $w_{rev}=w/(2+k)$, where w is the total number of turns to be fitted, and k may be equal to 0, 2, 4, 6 . . . etc. The constant k is a multiple of two, including the value zero. This results in reversal or layering in each case after an exactly defined number of turns, with that wire which was first of all located deepest in the slot now being located furthest upward after reversal.

k is preferably chosen to be as small as possible, which results in particularly well organized wire routing which at the same time guarantees a high filling factor.

Triple reversal, in each case after w/4, 2*w/4 and 3*w/4 turns, is particularly preferred during production of the winding, with w being the total number of turns to be fitted. This results in a sufficiently high statistical confidence level that the stray flux linking will be uniform. In this case, the copper filling factor still corresponds approximately to the value without reversal, and the uniform distribution of the overall current between the conductor elements is ensured with a sufficiently high statistical confidence level. On the other hand, the number of reversals is still sufficiently low to avoid irregularities during the winding process.

With a small constant k which is, for example, preferably zero or, in particular, preferably two, excessively frequent crossing of the wires in one layer is avoided, which would mean the wires in the next layer being spread apart from one another to a lesser or greater extent.

The reversal points are advantageously shifted as a function of the slot geometry, the total number of turns to be fitted and/or the winding scheme. Even better results can thus be achieved, depending on the application, such as particularly high filling factors and particularly uniform current distribution in the slot.

The number of turns which a conductor element which is furthest upward in a slot passes through is advantageously the same, or at least approximately the same, as the number of turns which the conductor element which is furthest downward passes through. This results in particularly uniform stray flux linking of all the conductor elements.

The winding former is, for example, a stator tooth of an electrical machine or else, in general form, an armature winding of an electrical machine or of an alternating current machine. The winding former may, however, also be in the form of a separate component, onto which the winding is first of all wound, and which is then fitted on to a stator tooth.

The method is preferably carried out by machine or using a winding machine. For example, the winding former is rotated under a number of wire guide nozzles in order to fit the parallel conductor elements, in order in this way to produce a winding with a large number of turns, and with a defined feed rate. This results in particularly cost-effective production which, furthermore, can easily be matched to the respective requirements.

The winding according to the invention for an electrical machine has a large number of conductor elements which are carried by a winding former and form a number of turns, with the conductor elements in the turns being arranged parallel alongside one another, and with the parallel conductor elements being reversed at least once and, in consequence, their positions being interchanged, at least in places.

This results in a particularly high copper filling factor in the slot of the electrical machine. The conductor elements are crossed over less frequently and run obliquely only at the reversal points. This results in shorter conductor element lengths, which likewise contributes to an improved filling factor. The current displacement is effectively suppressed, and the relatively simple routing of the conductor elements or wires even allows production using modern automatic winding machines.

The conductor elements which are located parallel alongside one another are preferably rotated through 180° after each w/(2+k) turns, where w is the total number of turns and k may be equal to 0, 2, 4, 6, . . . etc. It is particularly preferable for the parallel conductor elements to be reversed three times, with a reversal point or reversal region occurring after w/4, 2*w/4 and 3*w/4 turns, and with w being the total number of turns. In this case, the winding has a copper filling factor which is approximately as great as that in a winding without reversals, but while nevertheless ensuring uniform distribution of the overall current between the conductor elements during operation of the electrical machine with a sufficiently high statistical confidence factor.

The reversal points are advantageously shifted with respect to one another on the winding former. This achieves an optimum result, depending on the slot geometry, the total number of turns and the winding scheme.

By way of example, the conductor elements are placed parallel alongside one another in a slot, with that conductor element which is located deepest in the slot before a reversal point being located furthest upward in the slot after the reversal point. The conductor elements are, for example, wires, in particular copper wires, and the winding former is preferably a stator tooth of an electrical machine or a separate winding former which is fitted on to a stator tooth after it has been wound.

According to a further aspect of the invention, an electrical machine is provided which has a winding according to the invention. The electrical machine may be, for example, a three-phase or alternating current machine, with the windings according to the invention being placed in the stator and/or rotor by means of slots.

The electrical machine can be produced cost-effectively, since the winding production can be carried out by machine. This machine has particularly low resistive heat losses, since the current displacement in the slots is effectively suppressed. Nevertheless, there is no need for complex wire or conductor routings, for example synthetic bars or transposed conductors.

One preferred embodiment of the invention will be described by way of example in the following text with reference to the figures.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a schematic end section of a winding having three conductor elements, as a preferred embodiment of the invention;

FIGS. 2a and 2b are side and top views of adjacent conductor elements in a known transposed conductor;

FIGS. 2c and 2d are side and top views of a complete transposed conductor according to the prior art;

DETAILED DESCRIPTION OF THE PRESENTLY PREFERRED EMBODIMENTS

Figure 3A:
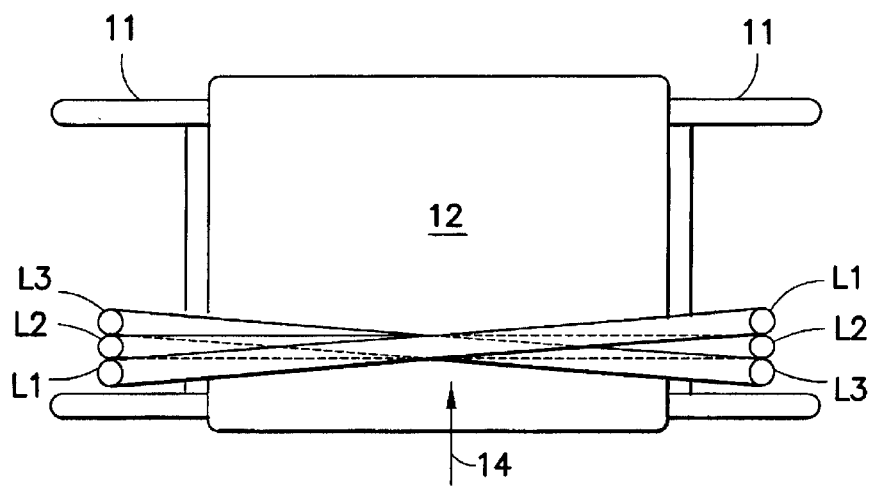
FIG. 3a is a side view of a single group of conductor elements.

FIG. 1 shows a winding according to the invention for an electrical machine, in the form of a section view. Three conductor elements L1, L2, L3 are arranged in a slot 10 of a winding former 11; there is one winding former 11 at each end of tooth 12. The conductor elements L1, L2, L3 in the embodiment shown here form a winding with four turns or winding layers 21, 22, 23, 24. In each of the turns or winding layers 21, 22, 23, 24, the conductor elements L1, L2, L3, wires or copper wires, are placed such that they are side by side in parallel in the slot 10.

The three conductor elements are arranged side by side in parallel in the sequence L1-L2-L3 in the first turn 21. In this case, the conductor element L1 is located furthest upward (uppermost) in the slot 10, while the conductor element L3 is located deepest (lowermost) in the slot 10. The conductor element L2 is located between the conductor element L1 and the conductor element L3. Each of the turns 21, 22, 23, 24 extends from upward to downward along the slot 10, so that a number of groups of three conductor elements L1, L2, L3 follow one another in each winding layer.

The conductor elements L1, L2, L3 are shifted in the second turn 22. The wire or conductor element L3 which is located deepest in the slot 10 in the previous turn 21 is now located furthest upward in the slot 10 after the shifting, while the conductor element L1 which is routed furthest upward in the slot 10 in the previous turn 21 is now located deepest in the slot 10 after the reversal. Thus, in comparison to the previous turn 21, the positions of the conductor elements L1 and L3 are interchanged, and the three conductor elements in the second turn 22 are arranged in the sequence L3-L2-L1.

In the next turn 23, the conductor elements L1, L2, L3 are once again arranged as in the first turn 21. This means that the second turn 22 is once again followed by a shifting of the conductor elements L1, L2, L3, or reversal of their sequence. The conductor element L3 in the turn 23 is located lowermost in the slot 10, while the conductor element L1 in the turn 23 is located furthest upward in the slot 10. Thus, here, the sequence is L1-L2-L3.

The conductor elements L1, L2, L3 are once again shifted between the turn 23 and the turn 24, or their sequence is reversed in comparison to the previous turn, so that the conductor elements L1, L2, L3 in the turn 24 are arranged in the same way as in the turn 22. This means that, in comparison to the previous turn 23, the positions of the conductor elements L1 and L3 in the turn 24 are once again interchanged, so that the conductor element L1 is now located deepest in the slot 10, while the conductor element L3 is located furthest upward in the slot 10. The sequence of the conductor elements is thus L3-L2-L1.

In the example shown here, the conductor elements L1, L2, L3 are shifted after w/4, 2*w/4 and 3*w/4, or the sequence of their arrangement is reversed, with w denoting the number of turns in the overall winding. This applies generally to a winding with any given number of turns, with layer reversal (shifting) in each case being carried out after a quarter of the total number of turns, and with the conductor element or wire which is located deepest in the slot 10 before the layer reversal being located furthest upward in the slot 10 after the layer reversal. In FIG. 1, the winding has four turns, i.e. w=4.

In general, the layer reversal in the winding in each case takes place after a number of turns $w_{rev}$, where $w_{rev}$ is defined by:

$$W_{rev} = w/(2+k), \text{ where } k=0, 2, 4, 6, \ldots \tag{1}$$

The placing of the wires or conductor elements L1, L2, L3 in an organized manner parallel alongside one another in the slot 10 results in a very high copper filling factor, which may be up to 20% greater than in conventional winding production. The layer reversal of the conductor elements L1, L2, L3 results in uniform stray flux linking of the conductor elements, and thus a uniform current distribution between the conductor elements. In the embodiment shown here, there are three conductor elements L1, L2, L3, for the sake of simplicity, but in general there may be any desired number of conductor elements.

In the sense of organized wire routing, which at the same time guarantees a high filling factor, it is expedient to choose k to be as small as possible. However, in this case, it has been found that, with one reversal after $w_{rev}$=w/2, it is in certain circumstances still impossible to achieve a very high statistical confidence level with regard to uniform stray flux linking since, owing to the reversal or layer reversal, irregularities may occur during the winding process, in some circumstances.

This means that, owing to the reversal, the wires or conductor elements in a lower layer cross over, for which reason the conductor elements in the next layer are spread apart from one another to a greater or lesser extent. It has been found that an optimum result for many applications is achieved after three reversals, with the reversal or layer reversal of the conductor elements in each case being carried out after $w_{rev}$=w/4, 2*w/4, 3*w/4. The copper filling factor then still corresponds approximately to the value without any reversal, and the uniform distribution of the overall current between the conductor elements is ensured with a sufficiently high statistical confidence level.

Depending on the slot geometry, the total number of turns and the winding scheme, it may be necessary to shift the reversal points. A particularly good result is achieved if the number of turns which a conductor element passes through as the uppermost wire is just as great, or at least approximately as great, as the number of turns which it passes through as the lowermost wire, in order to achieve uniform stray flux linking of all the conductor elements.

Figure 3B:
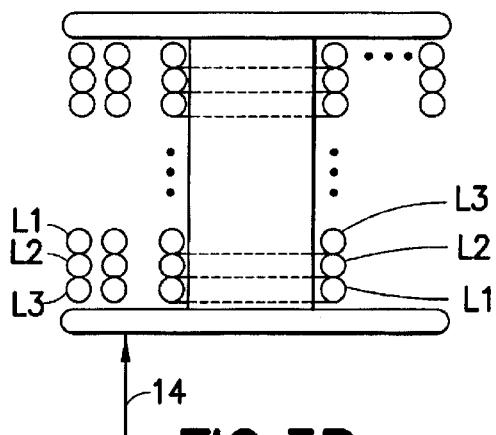
FIG. 3b is an end view with three turns in place.
Figure 3C:
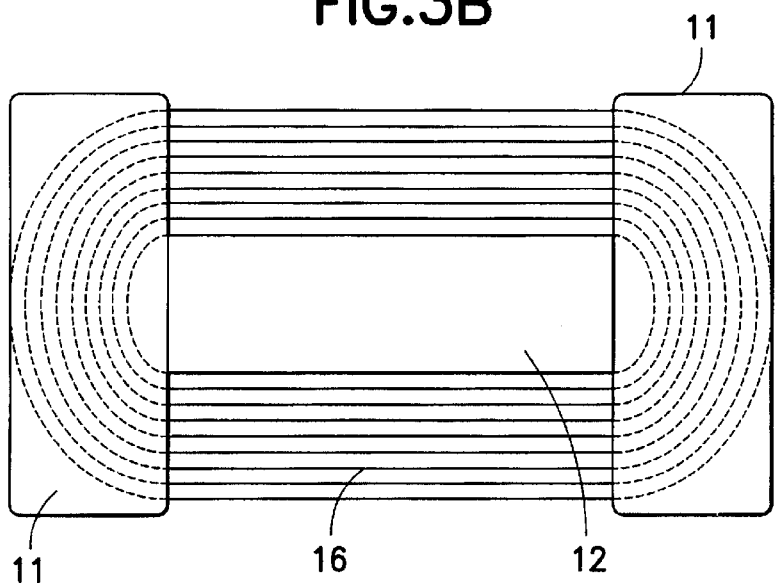
FIG. 3c is a top view of a complete winding.

FIG. 3a shows a group of three wires with a single cross-over or reversal 14 on a tooth or winding dummy 12. FIG. 3b is an end view, similar to FIG. 1, after three turns have been placed. FIG. 3c is a top view of the completed winding 16.

A winding machine is used for the production of the windings. For the winding process, a winding former which is, for example, a stator tooth is rotated under a total number of n conductor element guides or wire guide nozzles, thus resulting in a winding with w turns and with a defined feed rate. In this case, the total number of guide elements or wire guide nozzles n is equal to the total number of parallel conductor elements or wires which are fitted on the winding former.

Figure 4B:
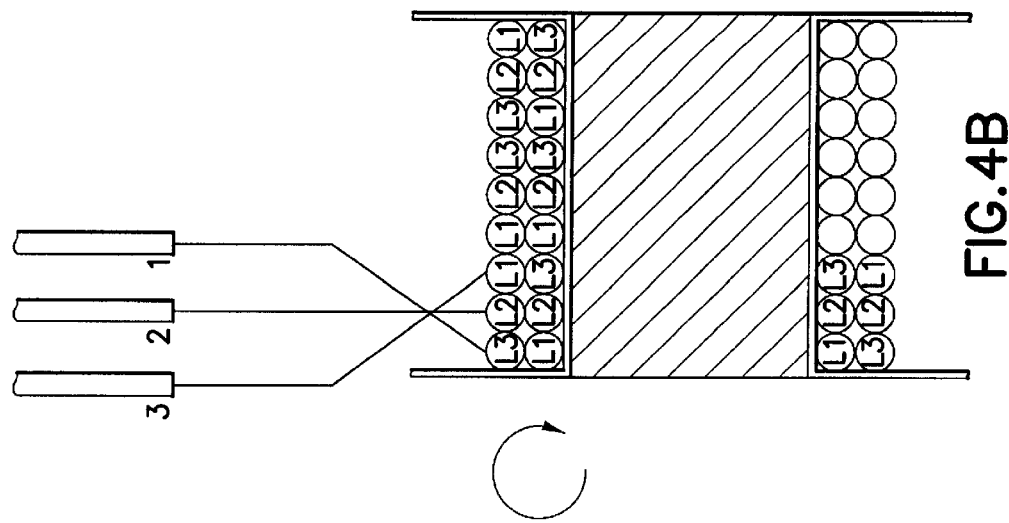
FIGS. 4a–4d show a schematic progression of the winding process.
Figure 4A:
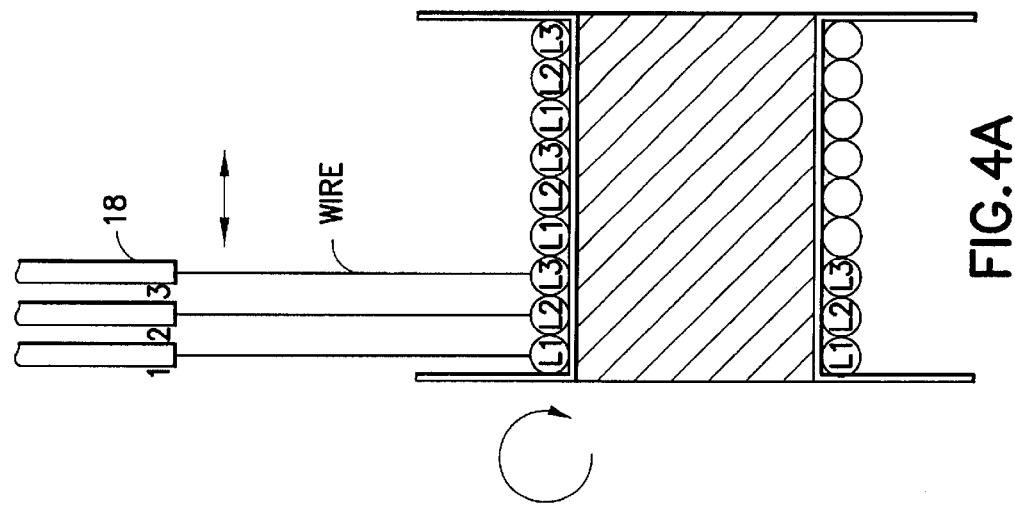
Figure 4D:
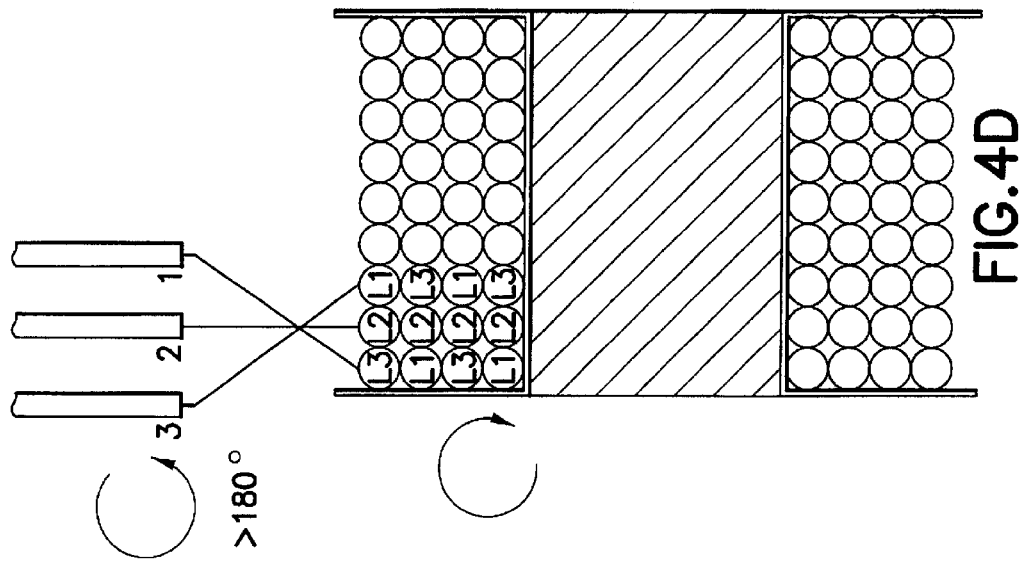
Figure 4C:
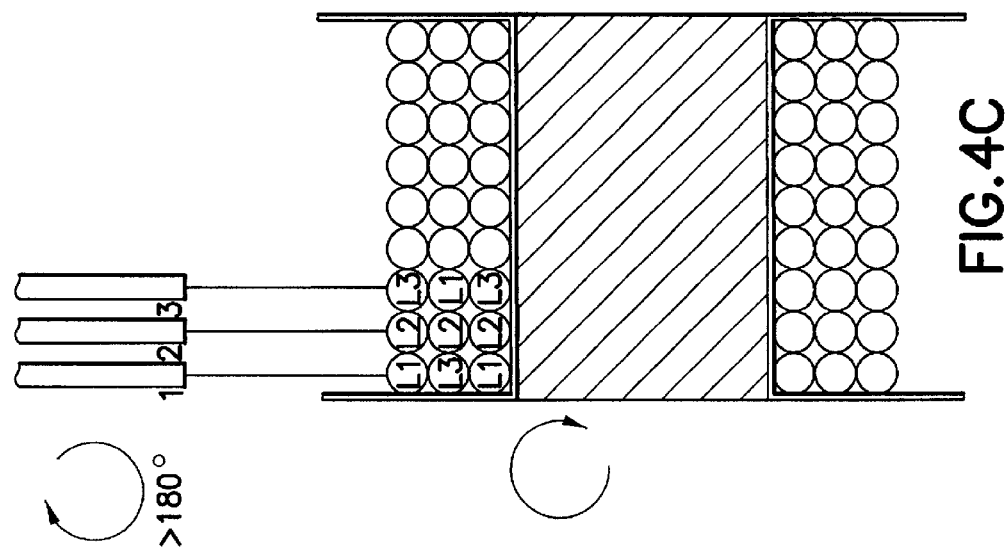

FIGS. 4a–4d show a winding former including end pieces 11 having slots 10 on either side of a tooth 12, and wire guide nozzles 18 from which wires LK1, L2, L3 are fed as the winding former rotates. FIG. 4a shows the winding after a single turn, while FIG. 4b shows the winding after two turns, etc. During the winding process, the winding former is always rotated in one direction, as indicated by the clockwise arrows. After each turn, the nozzles as a group are rotated 180° to achieve a reversal of the wire positions. However, the nozzles are rotated in opposite directions for successive reversals.

During winding production, the conductor elements L1, L2, L3 are placed in the slot 10 such that they are organized parallel alongside one another. In order to achieve the layer reversals which have already been described above, the wire guide nozzles are rotated through 180° in a defined manner after $w_{rev}=w/(2+k)$, so that the wire or conductor element which was located deepest in the slot 10 initially is now the uppermost one after the reversal (see FIG. 1). In this case, k=0, 2, 4, 6 etc. The reversal points on the winding former are expediently shifted whenever the wire guide nozzles are rotated, which may be necessary in some circumstances depending on the slot geometry, the total number of turns and the winding scheme.

In addition, FIG. 2a and FIG. 2b also show a known synthetic bar or transposed conductor. In this case, FIG. 2a shows two adjacent conductor elements in the transposed conductor, while FIG. 2b shows a complete transposed conductor.

In summary, the present invention results in a higher filling factor than in known windings or electrical machines with simplified production, since the conductor elements cross less frequently in the slot area, and the conductor element lengths are shorter owing to the reduced oblique routing of the conductor elements. Nevertheless, the arrangement of the conductor elements according to the invention ensures uniform distribution of the overall current between the conductor elements with a sufficiently high statistical confidence level. Current displacement is effectively avoided. Furthermore, the present invention makes it possible to produce windings using machines, thus considerably reducing the costs.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A winding for an electrical rotating machine, said winding comprising a winding former for fitting onto a stator tooth, said winding former having a slot with a plurality of conductor elements wound therein in a plurality of winding layers, wherein the conductor elements are arranged side by side in parallel in a predetermined sequence in the winding layers, the predetermined sequence being reversed in at least one place in said winding layers so that one of said conductor elements which is uppermost in said slot before said place is lowermost in said slot after said place.

2. The winding as claimed in claim 1, wherein the parallel conductor elements form a group which is rotated through 180° after each w/(2+k) winding layers, where w is the total number of winding layers and k may be equal to 0, 2, 4, 6, . . . etc.

3. The winding as claimed in claim 1, wherein the parallel conductor elements are reversed three times, with a reversal after w/4, 2*w/4 and 3*w/4 winding layers, and with w being the total number of winding layers.

4. The winding as claimed in claim 1, wherein the reversal places are shifted with respect to one another on the winding former.

5. An electrical rotating machine having at least one winding, said winding comprising a winding former for fitting onto a stator tooth, said winding former having a slot carrying a plurality of conductor elements which form a plurality of winding layers, said conductor elements being placed side by side in parallel in a predetermined sequence in the winding layers, the predetermined sequence being reversed in at least one place in said winding layers so that one of said conductor elements which is uppermost in said slot before said place is lowermost in said slot after said place.

* * * * *